(12) United States Patent
Fischer et al.

(10) Patent No.: US 10,394,855 B2
(45) Date of Patent: Aug. 27, 2019

(54) GRAPH-MODELED DATA PROCESSING IN A RELATIONAL DATABASE

(71) Applicant: SAP SE, Walldorf (DE)

(72) Inventors: Thomas Fischer, Sandhausen (DE);
Hinnerk Gildhoff, Heidelberg (DE);
Romans Kasperovics, Heidelberg (DE);
Cornelia Kinder, Walldorf (DE);
Marcus Paradies, Walldorf (DE)

(73) Assignee: SAP SE, Walldorf (DE)

( * ) Notice: Subject to any disclaimer, the term of this patent is extended or adjusted under 35 U.S.C. 154(b) by 272 days.

(21) Appl. No.: 15/419,875

(22) Filed: Jan. 30, 2017

(65) Prior Publication Data
US 2018/0218065 A1   Aug. 2, 2018

(51) Int. Cl.
*H04L 29/06* (2006.01)
*G06F 16/28* (2019.01)
*G06F 16/901* (2019.01)
*G06F 21/62* (2013.01)

(52) U.S. Cl.
CPC ........ *G06F 16/288* (2019.01); *G06F 16/9024* (2019.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 7,599,947 B1 * | 10/2009 | Tolbert | ............... | G06F 17/30917 |
| 2004/0044655 A1 * | 3/2004 | Cotner | ................ | G06F 21/6227 |
| 2006/0004851 A1 * | 1/2006 | Gold | ................... | G06F 17/3056 |
| 2008/0016038 A1 * | 1/2008 | Moestl | .............. | G06F 17/30404 |
| 2014/0201234 A1 * | 7/2014 | Lee | ................... | G06F 17/30964 |
| | | | | 707/769 |
| 2015/0135296 A1 * | 5/2015 | Cason | ................. | H04L 63/0815 |
| | | | | 726/8 |
| 2015/0249669 A1 * | 9/2015 | Gamage | .................. | H04L 63/10 |
| | | | | 726/26 |
| 2015/0278396 A1 * | 10/2015 | Vasilyeva | ......... | G06F 17/30958 |
| | | | | 707/769 |
| 2015/0281248 A1 * | 10/2015 | Obbard | ................. | H04L 63/101 |
| | | | | 726/1 |
| 2016/0342709 A1 * | 11/2016 | Fokoue-Nkoutche | | ...................... |
| | | | | G06F 17/30958 |
| 2017/0052952 A1 * | 2/2017 | Alexander | ........ | G06F 17/30011 |
| 2017/0053294 A1 * | 2/2017 | Yang | ............. | G06Q 30/0201 |
| 2018/0203918 A1 * | 7/2018 | Chen | ................ | G06F 17/30604 |

* cited by examiner

*Primary Examiner* — Shin-Hon (Eric) Chen
(74) *Attorney, Agent, or Firm* — Mintz Levin Cohn Ferris Glovsky and Popeo, P.C.

(57) ABSTRACT

A system for processing graph-modeled data in a relational database is provided. In some implementations, the system performs operations comprising: receiving, from a first user, a request to define a graph algorithm operating on a graph workspace, the graph workspace comprising at least a portion of graph-modeled data stored at a relational database; applying a first security rule associated with the relational database, the applying comprising determining whether the first user has a privilege to define the graph algorithm operating on the graph workspace; and storing the graph algorithm at the relational database, when the first user is determined to have the privilege to define the graph algorithm operating on the graph workspace. Related methods and articles of manufacture, including computer program products, are also provided.

20 Claims, 6 Drawing Sheets

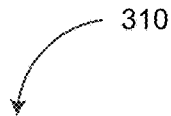

[00CREATE SCHEMA <SCHEMA NAME>;
  CREATE COLUMN TABLE <SCHEMA NAME> . <TABLE NAME> (
    <PROPERTY NAME> <VARIABLE TYPE>);
  CREATE COLUMN TABLE <SCHEMA NAME> . <TABLE NAME> (
"<PROPERTY NAME> <VARIABLE TYPE>);

FIG. 3A

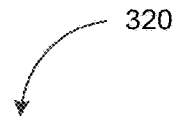

[00CREATE GRAPH WORKSPACE <workspace_name>
  VERTEX TABLE <table_name>
    KEY <column_name_list>
  EDGE TABLE <table_name>
    SOURCE <column_name_list>
    TARGET <column_name_list>
KEY <column_name_list>

FIG. 3B

GRAPH-MODELED DATA PROCESSING IN A RELATIONAL DATABASE

TECHNICAL FIELD

The subject matter described herein relates to database management, and more particularly, to the processing of graph-modeled data in a relational database.

BACKGROUND

In a graph database, data is represented and stored using graph structures including, for example, vertices and edges. For instance, the vertices of a graph may correspond to the individual data items stored in a graph database while the edges of the graph may define the relationships between various data items. The vertices and the edges of the graph may be associated with various properties (e.g., weights, costs, distances, and/or the like) that further describe individual data items as well as the relationships between various data items. Thus, relationships between data items are stored explicitly (e.g., as edges and one or more corresponding properties) in a graph database.

By contrast, a relational database is configured to store relationships between data items implicitly. In a relational database, data is organized into tables (e.g., relations) that contain data items sharing one or more of the same attributes. Each data item in a table may be associated with a key. Here, a relationship between data items residing in different tables is implicitly defined by cross-referencing the respective keys of the data items. For example, one table may include the keys of related data items from another table, thereby linking data items from two different tables. Alternately and/or additionally, a relational database may provide tables for storing the keys of related data items from separate tables.

SUMMARY

In one aspect, methods, systems, and articles of manufacture, including computer program products, are provided. A system may include at least one data processor and at least one memory. The memory may store instructions that result in operations when executed by the at least one data processor. The operations may include: receiving, from a first user, a request to define a graph algorithm operating on a graph workspace, the graph workspace comprising at least a portion of graph-modeled data stored at a relational database; applying a first security rule associated with the relational database, the applying comprising determining whether the first user has a privilege to define the graph algorithm operating on the graph workspace; and storing the graph algorithm at the relational database, when the first user is determined to have the privilege to define the graph algorithm operating on the graph workspace.

In some variations, one or more of the features disclosed herein including the following features can optionally be included in any feasible combination. The first user can be determined to have the privilege to define the graph algorithm operating on the graph workspace when the first user is a creator and/or owner of the graph workspace.

In some variations, the operations can further include: responding to a request from the first user to execute the graph algorithm operating on the graph workspace, the responding comprising applying a second security rule associated with the relational database to at least determine whether the first user has a privilege to execute the graph algorithm. The first user can be determined to have the privilege to execute the graph algorithm when the first user is a creator and/or owner of the graph workspace. The first user can be determined to have the privilege to execute the graph algorithm when a second use who is a creator and/or owner of the graph workspace grants the first user the privilege to execute the graph algorithm.

In some variations, the operations can further include: responding to a request from the first user to export the graph algorithm operating on the graph workspace, the responding comprising applying a third security rule associated with the relational database to determine whether the first user has a privilege to export the graph algorithm. The first user can be determined to have the privilege to export the graph algorithm when the first user is a creator and/or owner of the graph workspace.

In some variations, the graph algorithm can be stored at the relational database as a stored procedure. The storing the graph algorithm as the stored procedure can include creating a dependency with respect to at least one existing database object, the at least one existing database object comprising a database table, a view, another graph workspace, and/or another graph algorithm.

In some variations, the graph algorithm can defined in a domain-specific programing language, and the storing of the graph algorithm can include converting the graph algorithm from the domain-specific programming language to a relational database specific programming language.

In some variations, the graph workspace can include a vertex table and an edge table corresponding to at least the portion of the graph-modeled data stored at the relational database.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A depicts a statement defining a table for storing one or more graph structures consistent with some implementations of the current subject matter;

FIG. 3B depicts a statement defining a graph workspace consistent with some implementations of the current subject matter;

When practical, similar reference numbers denote similar structures, features, or elements.

DETAILED DESCRIPTION

Figure 1:
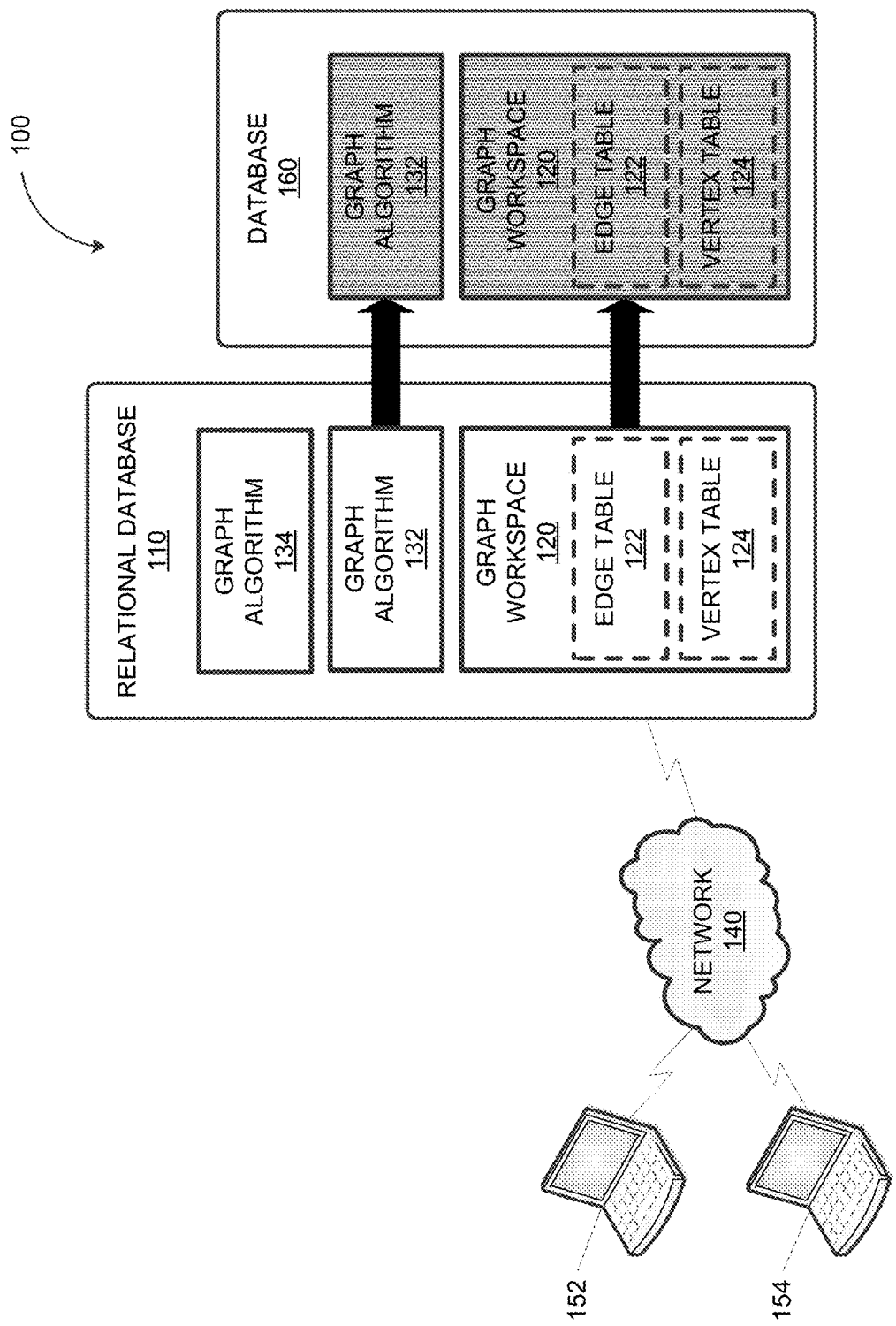
FIG. 1 depicts a block diagram illustrating a network environment consistent with some implementations of the current subject matter.

A relational database can be configured to store graph-modeled data. For example, the relational database may store the vertices and edges of a graph in different tables. However, a conventional relational database is unable to support graph algorithms operating on graph-modeled data (e.g., shortest path, minimum flow, page rank, and/or the like) stored at the relational database. As such, these graph algorithms are typically performed by an external application or processing engine (e.g., a graph management system (GMS)), thereby requiring the exportation of graph-modeled data from the relational database to a destination that is agnostic to the rules (e.g., security rules) enforced by the relational database with respect to the graph-modeled data (e.g., authorizations, privileges, ownership, and/or the like).

In some implementations of the current subject matter, a relational database can be configured to support graph algorithms such that graph algorithms on graph-modeled data stored at the relational database may be performed within the relational database. Performing graph algorithms within the relational database may enable the enforcement of one or more rules with respect to the graph-modeled data including, for example, authorizations, privileges, and/or ownership associated with the graph-modeled data.

In some implementations of the current subject matter, a graph algorithm can be implemented as a stored procedure at a relational database. That is, the relational database may support the creation and/or customization of a graph algorithm and further store the executable code corresponding to the graph algorithm at the relational database. As a stored procedure, the graph algorithm can be invoked by calling the graph algorithm in a native language of the relational database (e.g., structured query language (SQL)). Furthermore, creating a stored procedure can also create dependencies with respect to one or more existing database objects including, for example, graph workspaces, database tables, views, and/or other stored procedures. Dependent database objects can be imported and/or exported along with the corresponding stored procedure. Moreover, modifying a dependent database object can trigger a re-validation of the corresponding stored procedure. Here, it should be appreciated that the relational database can also support graph algorithms that may be any generic and/or off-the-shelf graph algorithms (e.g., shortest path, minimum flow, page rank, and/or the like) operating on the graph-modeled data stored at the relational database.

According to some implementations of the current subject matter, a stored graph algorithm can be created and/or customized using a domain-specific programming language (e.g., a graph-specific programming language such as graph script and/or the like), which operates on graph structures such as vertices, edges, and/or the like. However, a relational database may store graph data in tables, which may be accessed and/or manipulated using a different programming language (e.g., a native relational database specific programming language such as SQL). As such, the relational database can be configured to convert a stored graph algorithm from a domain-specific programming language (e.g., graph script) to a relational database specific programming language (e.g., SQL). For instance, the relational database can be configured to convert the references to graph structures (e.g., vertices, edges, paths, and/or the like) in a stored graph algorithm with analogous references to table structures (e.g., scalar, rows, columns, and/or the like) storing the graph-modeled data in the relational database.

In some implementations of the current subject matter, implementing a graph algorithm as a stored procedure in a relational database enables the native execution of the graph algorithm within the relational database instead of at an external application or engine (e.g., a GMS). Accordingly, the graph algorithm may be performed on the graph-modeled data stored at the relational database in a manner that is consistent with the rules enforced by the relational database with respect to the underlying graph-modeled data. For instance, the relational database may store graph-modeled data as one or more graph workspace objects that each includes an edge table and a vertex table for a corresponding graph. The relational database may control, based on user privileges with respect to an underlying graph workspace object, the creation, execution, and/or export of one or more stored graph algorithms operating on the graph workspace object.

FIG. 1 depicts a block diagram illustrating a network environment 100 consistent with some implementations of the current subject matter. Referring to FIG. 1, the network environment 100 can include a relational database 110 that communicates with a plurality of client devices including, for example, a first client device 152 and a second client device 154. As shown in FIG. 1, the relational database 110 can communicate with the first client device 152 and/or the second client device 154 via a wired and/or wireless network 140, which can be a wide area network (WAN), a local area network (LAN), and/or the Internet. In some implementations of the current subject matter, the relational database 110 can be configured to store graph-modeled data. For instance, the relational database 110 can store graph-modeled data as a plurality of graph workspace objects including, for example, a graph workspace 120.

Figure 2:
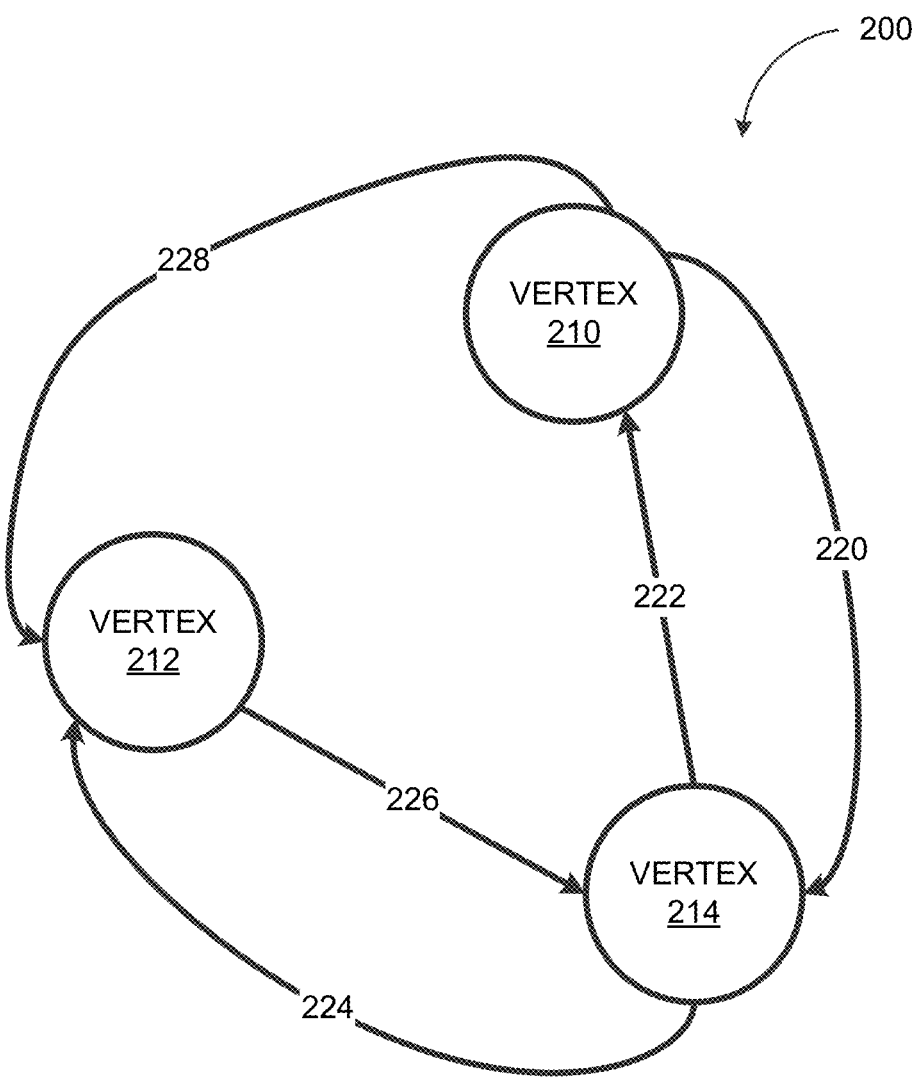
FIG. 2 depicts graph-modeled data consistent with some implementations of the current subject matter.

FIG. 2 depicts graph-modeled data 200 consistent with some implementations of the current subject matter. As shown in FIG. 2, the graph-modeled data 200 may include a plurality of vertices including, for example, a first vertex 210, a second vertex 212, and a third vertex 214. Each of the first vertex 210, the second vertex 212, and the third vertex 214 may correspond to a data item. The first vertex 210, the second vertex 212, and/or the third vertex 214 may also be associated with one or more properties that further describe the corresponding data item. Furthermore, the graph-modeled data 200 may include a plurality of edges including, for example, a first edge 220, a second edge 222, a third edge 224, a fourth edge 226, and a fifth edge 228. Each of the first edge 220, the second edge 222, the third edge 224, the fourth edge 226, and the fifth edge 228 may correspond to a relationship between the two vertices linked by the edge. The first edge 220, the second edge 222, the third edge 224, the fourth edge 226, and/or the fifth edge 228 may also be associated with properties (e.g., weights, distances, costs, and/or the like) that further describe the relationships amongst the first vertex 210, the second vertex 212, and the third vertex 214.

It should be appreciated that in some implementations of the current subject matter, the relationship between two vertices can be directional. For instance, the first edge 220 and the second edge 222 indicate a bidirectional relationship between the data items corresponding to the first vertex 210 and the third vertex 214. By contrast, a single edge (e.g., the fifth edge 228) between the first vertex 210 and the second vertex 212 indicates that the data item corresponding to the first vertex 210 is related to the data item corresponding to the second vertex 212 but not vice versa.

Referring to FIGS. 1-2, the graph workspace 120 may correspond to the graph-modeled data 200. As such, the graph workspace 120 can include an edge table 122 and a vertex table 124. The first edge 220, the second edge 222, the third edge 224, the fourth edge 226, and the fifth edge 228 as well as any corresponding properties associated with one or more of these edges can be stored in the edge table 122. Meanwhile, the first vertex 210, the second vertex 212, and the third vertex 214 as well as any corresponding properties associated with one or more of these vertices can be stored in the vertex table 124.

In some implementations of the current subject matter, the relational database 110 can be configured to support the creation, execution, and/or export of one or more graph algorithms operating on the graph-modeled data (e.g., the graph workspace 120) stored at the relational database 110. For instance, a first graph algorithm 132 (e.g., shortest path, minimum flow, page rank, and/or the like) operating on the graph workspace 120 can be implemented as a stored procedure such that executable code corresponding to the first graph algorithm 132 is stored at the relational database 110. As such, the creation, execution, and/or export of the first graph algorithm 132 are required to conform to the rule enforced by the relational database 110. For instance, the relational database 110 may control, based on the privileges of a user with respect to the underlying graph-modeled data stored at the relational database 110, the ability of the user to create, execute, and/or export the first graph algorithm 132.

In some implementations of the current subject matter, the relational database 110 may recognize a user who created the graph workspace as the owner of the graph workspace. For example, a user of the first client device 152 can create the edge table 122 and the vertex table 124. FIG. 3A depicts a statement 310 (e.g., a SQL statement) defining a table for storing one or more graph structures consistent with some implementations of the current subject matter. The user of the first client device 152 can send, to the relational database 110, the statement 310, thereby causing the relational database 110 to create the edge table 122 and/or the vertex table 124. At this point, the user of the first client 152 can create the graph workspace 120 to include both the edge table 122 and the vertex table 124. FIG. 3B depicts a statement 320 (e.g., a SQL statement) defining a graph workspace consistent with some implementations of the current subject matter. The user of the first client device 152 can send, to the relational database 110, the statement 310, thereby causing the relational database 110 to create the graph workspace 120. By creating the graph workspace 120, the user of the first client device 152 may be the owner of the graph workspace 120. According to some implementations of the current subject matter, the owner of the graph workspace 120 can have a plurality of privileges with respect to the graph workspace 120 including, for example, an ability to define one or more graph algorithms operating on the graph workspace 120 and/or an ability to grant other users privileges with respect to the graph workspace 120.

In some implementations of the current subject matter, the relational database 110 can allow the owner of the graph workspace 120 to define and/or execute one or more graph algorithms operating on the graph workspace 120. For example, the user of the first client device 152 created the graph workspace 120 and is therefore able to define the first graph algorithm 132, which operates on the graph workspace 120. The user of the first client device 152 is further able to execute the first graph algorithm 132, for example, by sending a statement (e.g., a SQL statement) to the relational database 110 that calls the first graph algorithm 132. According to some implementations of the current subject matter, the relational database 110 can be configured to support nested graph algorithms that invoke one or more other graph algorithms. For instance, the user of the first client device 152 can define the first graph algorithm 132, which calls a second graph algorithm 134 when executed by the relational database 110.

In some implementations of the current subject matter, the validity of the first graph algorithm 132 can depend on the existence of the graph workspace 120. For instance, the relational database 110 can invalidate the first graph algorithm 132, when the owner of the graph workspace 120 (e.g., the user of the first client device 152) deletes the graph workspace 120. Invalidating the first graph algorithm 132 may prevent the first graph algorithm 132 from being executed. Alternately and/or additionally, the relational database 110 can reinstate the first graph algorithm 132, when the owner of the graph workspace 120 (e.g., the user of the first client device 152) subsequently recreates the graph workspace 120.

In some implementations of the current subject matter, the relational database 110 can be configured to recognize one or more privileges that have been granted with respect to a graph algorithm and/or the underlying graph-modeled data stored at the relational database 110. For example, the user of the first client device 152, as the owner of the graph workspace 120, can grant a user of the second client device 154 the privilege to also execute the first graph algorithm 132 on the graph workspace 120. In doing so, the relational database 110 can allow the user of the second client device 154 to also execute the first graph algorithm 132 on the graph workspace 120 (e.g., by sending a statement (e.g., SQL statement) to the relational database 100 that calls the first graph algorithm 132). However, it should be appreciated that the privilege granted to the user of the second client device 154 may be limited. For instance, the user of the second client device 154 may be able to execute the first graph algorithm 132 on only committed portions of the graph workspace 120. Thus, if the owner of the graph workspace 120 (e.g., the user of the first client device 152) alters the graph workspace 120 (e.g., by inserting and/or removing one or more edges and/or vertices) without committing these changes, the user of the second client device 154 can execute the first graph algorithm 132 on an unaltered version of the graph workspace 120 that does not have any of the changes made by the owner of the graph workspace 120.

In some implementations of the current subject matter, the relational database 110 can allow the owner of the graph workspace 120 to export the first graph algorithm 132 (e.g., to another database system). For instance, the user of the first client device 152 can export the first graph algorithm 132 from the relational database 110 to a database 160. The exporting of the first graph algorithm 132 can include exporting the underlying graph-modeled data (e.g. the graph workspace 120). Thus, the user of the first client device 152 can export the first graph algorithm 132 as well as the graph workspace 120 to the database 160. When the first graph algorithm 132 and the graph workspace 120 is imported into the database 160, the first graph algorithm 132 can be executed on the graph workspace 120 by the database 160.

Figure 4:
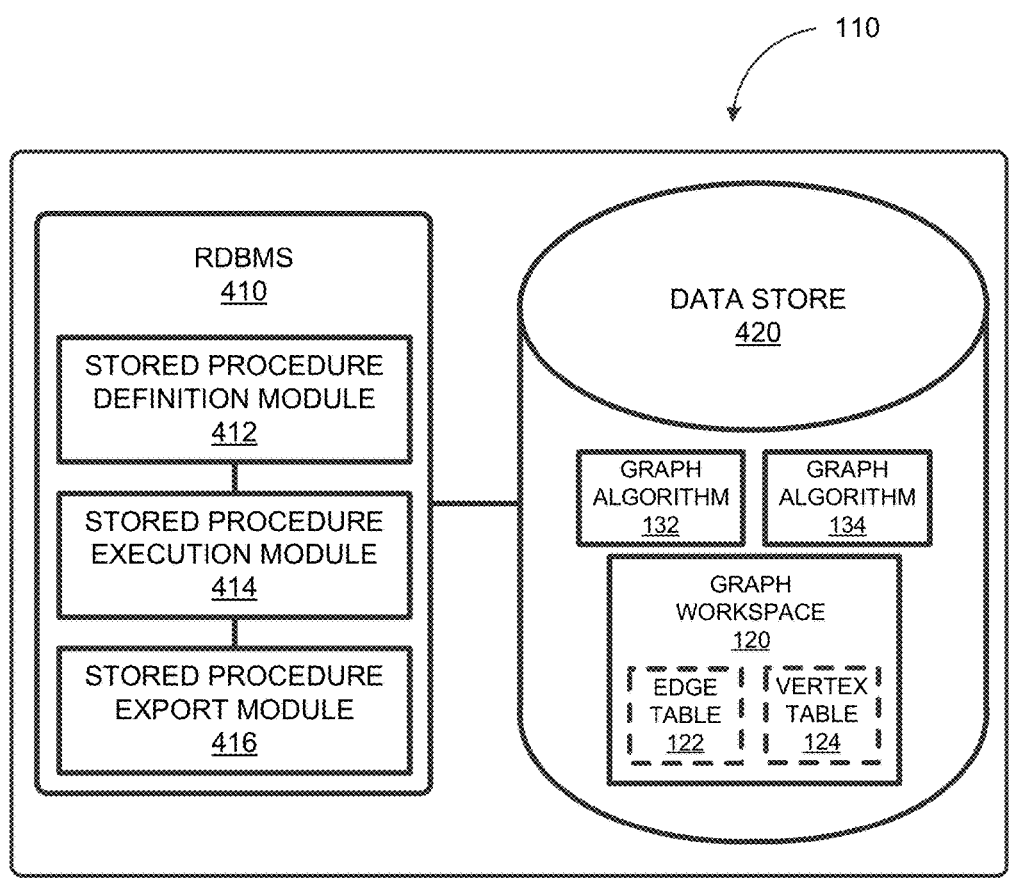
FIG. 4 depicts a block diagram illustrating a relational database consistent with implementations of the current subject matter.

FIG. 4 depicts a block diagram illustrating the relational database 110 consistent with implementations of the current subject matter. Referring to FIG. 4, the relational database 110 can include a relational database management system (RDBMS) 410 and one or more data stores 420.

As shown in FIG. 4, the data store 420 can be configured to store data including, for example, the first graph algorithm 132, the second graph algorithm 134, and the graph workspace 120. In some implementations of the current subject matter, the RDBMS 410 can be configured to enforce one or more rules that control access to the data stored in the data stores 220. For instance, the RDBMS 410 can control the creation, execution, and/or export of graph algorithms (e.g., the first graph algorithm 132 and/or the second graph algorithm 134) operating on the graph workspace 120.

Referring again to FIG. 4, the RDBMS 410 can include a plurality of modules including, for example, a stored procedure definition module 412, a stored procedure execution module 414, and a stored procedure export module 416. In some implementations of the current subject matter, the stored procedure definition module 412 can be configured to receive a definition for a stored procedure, which may be a graph algorithm expressed in a domain specific programing language (e.g., graph script) and operating on graph-modeled data stored in the data stores 220. For instance, the stored procedure definition module 412 can receive, from the user of the first client device 152, one or more statements (e.g., SQL statements) defining the first graph algorithm 132 and/or the second graph algorithm 134, which operate on the graph workspace 120.

In some implementations of the current subject matter, the stored procedure definition module 412 can be configured to enforce one or more security rules. In particular, the stored procedure definition module 412 can determine whether the user of the first client device 152 has the requisite privilege to define graph algorithms that operate on the graph workspace 120. According to some implementations of the currents subject matter, the user of the first client device 152 may be allowed to define graph algorithms that operate on the graph workspace 120, when the user of the first client device 152 is an owner of the graph workspace 120 and/or creator of the graph workspace 120. If the user of the first client device 152 has the requisite privilege to define graph algorithms operating on the graph workspace 120, the stored procedure definition module 412 can allow the definition of the first graph algorithm 132 and/or the second graph algorithm 134 by storing the executable code corresponding to the first graph algorithm 132 and/or the second graph algorithm 134 (e.g., in the data stores 220). Storing the executable code for the first graph algorithm 132 and/or the second graph algorithm 134 enables the algorithms to be invoked via one or more statements (e.g., SQL statements) to the RDBMS 410.

In some example embodiments, when the stored procedure definition module 412 defines a first graph algorithm 132 and/or the second graph algorithm 134 as stored procedures, the stored procedure definition module 412 can further create dependencies with respect to one or more existing database objects including, for example, graph workspaces, database tables, views, and/or other stored procedures. As noted above, dependent database objects can be can be imported and/or exported along with the corresponding stored procedure while modifying a dependent database object can trigger a re-validation of the corresponding stored procedure. Thus, dependent database objects (e.g., graph workspaces, database tables, views, other stored procedures) associated with the first graph algorithm 132 can be imported (e.g., from the database 160) and/or exported (e.g., from the relational database 110) along with the first graph algorithm 132. Modifying a dependent database object can also trigger a re-validation of the first graph algorithm 132. Similarly, dependent database objects (e.g., database tables, views, other stored procedures) associated with the second graph algorithm 134 can be imported (e.g., from the database 160) and/or exported (e.g., from the relational database 110) along with the second graph algorithm 134. Modifying a dependent database object can also trigger a re-validation of the second graph algorithm 134.

In some implementations of the current subject matter, the stored procedure execution module 414 can be configured to respond to requests to execute one or more stored procedures, which may be graph algorithms operating on graph-modeled data stored in the data stores 220. For instance, the stored procedure execution module 414 can respond to requests from the user of the first client device 152 and/or the user of the second client device 154 to execute the first graph algorithm 132 and/or the second graph algorithm 134, which operate on the graph workspace 120. According to some implementations of the current subject matter, the stored procedure execution module 414 can be configured to enforce one or more security rules. For example, the stored procedure execution module 414 can execute the first graph algorithm 132 and/or the second graph algorithm 134 only when the requesting user has the requisite privilege to execute the first graph algorithm 132 and/or the second graph algorithm 134. Here, the owner and/or creator of the graph workspace 120 may have the requisite privilege to execute the first graph algorithm 132 and/or the second graph algorithm 134 on the graph workspace 120. Alternately and/or additionally, the owner and/or creator of the graph workspace 120 can grant execution privilege to one or more other users (e.g., the user of the second client device 154) such that stored procedure execution module 414 will also allow these users to execute the first graph algorithm 132 and/or the second graph algorithm 134 on the graph workspace 120.

In some implementations of the current subject matter, the stored procedure execution module 414 can execute a graph algorithm by at least converting the graph algorithm from a domain-specific programming language (e.g., graph script) to a relational database specific programming language (e.g., SQL). For instance, the stored procedure execution module 414 can convert the references to graph structures (e.g., vertices, edges, paths, and/or the like) in the graph algorithm with analogous references to the table structures (e.g., scalar, rows, columns, and/or the like) storing the graph-modeled data in the relational database 110.

In some implementations of the current subject matter, the stored procedure export module 416 can be configured to respond to requests to export one or more stored procedures, which may include graph algorithms operating on graph-modeled data stored in the data stores 220. For example, the stored procedure export module 416 can respond to requests to export the first graph algorithm 132 and/or the second graph algorithm 134 (e.g., to the database 160) by determining whether the requesting user has the requisite privilege to export the first graph algorithm 132 and/or the second graph algorithm 134 as well as the underlying graph workspace 120. According to some implementations of the current subject matter, the owner and/or creator of the graph workspace 120 has the privilege to export the first graph algorithm 132 and/or the second graph algorithm 134, which operate on the graph workspace 120. As such, the stored procedure export module 416 can allow the user of the first client device 152 to export the first graph algorithm 132 and/or the second graph algorithm 134 as well as the graph workspace 120 to the database 160. By contrast, the user of the second client device 154, who is not an owner and/or creator of the graph workspace 120, does not have the requisite privilege to export the first graph algorithm 132 and/or the second graph algorithm 134. Here, the stored procedure export module 416 can deny requests from the user of the second client device 154 to export the first graph algorithm 132 and/or the second graph algorithm 134 as well as the underlying graph workspace 120.

Figure 5:
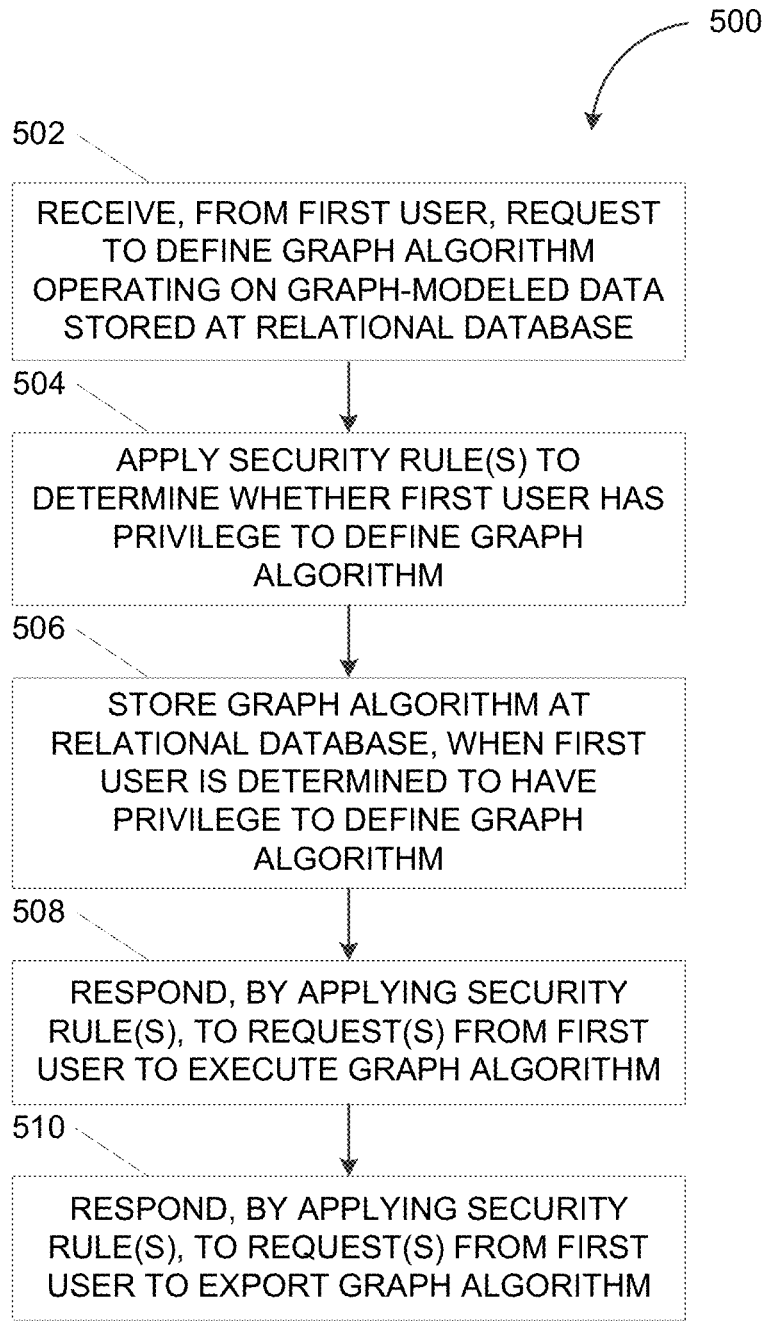
FIG. 5 depicts a flowchart illustrating a process for processing graph-modeled data in a relational database, in accordance with some example embodiments.

FIG. 5 depicts a flowchart illustrating a process 500 for processing graph-modeled data in a relational database consistent with implementations of the current subject matter. Referring to FIGS. 1-5, the process 500 can be performed by the RDBMS 410.

The RDBMS 410 can receive a request, from a first user, to define a graph algorithm operating on graph-modeled data stored at the relational database 110 (502). For example, the RDBMS 410 (e.g., the stored procedure definition module 412) can receive, from the user of the first client device 152, one or more statements (e.g., SQL statements) defining the first graph algorithm 132 and/or the second graph algorithm 134, which operate on the graph workspace 120. The first graph algorithm 132 and/or the second graph algorithm 134 may be expressed in a domain-specific programing language (e.g., graph script) that differs from the native language of the relational database 110 (e.g., SQL). Furthermore, in some implementations of the current subject matter, the first graph algorithm 132 can be a nested graph algorithm that, when executed, invokes one or more other graph algorithms such as the second graph algorithm 134.

The RDBMS 410 can apply one or more security rules of the RDBMS 410 to determine whether the first user has a privilege to define the graph algorithm operating on the graph-modeled data (504). For example, the user of the first client device 152 may be allowed to define graph algorithms that operate on the graph workspace 120 (e.g., the first graph algorithm 132 and/or the second graph algorithm 134), when the user of the first client device 152 is an owner of the graph workspace 120 and/or creator of the graph workspace 120.

The RDBMS 410 can store the graph algorithm at the relational database 110, when the RDBMS 410 determines that the first user of the client device has the privilege to define the graph algorithm operating on the graph-modeled data stored at the relational database 110 (506). For instance, if the user of the first client device 152 has the requisite privilege to define graph algorithms operating on the graph workspace 120, the RDBMS 410 (e.g., the stored procedure definition module 412) can allow the definition of the first graph algorithm 132 and/or the second graph algorithm 134 by storing the executable code corresponding to the first graph algorithm 132 and/or the second graph algorithm 134 (e.g., in the data stores 220). Storing the executable code for the first graph algorithm 132 and/or the second graph algorithm 134 enables the algorithms to be invoked via one or more statements (e.g., SQL statements) to the RDBMS 410.

The RDBMS 410 can respond, by at least applying one or more security rules of the RDBMS 410, to one or more requests from the first user to execute the graph algorithm (508). For example, the RDBMS 410 (e.g., the stored procedure execution module 414) can respond to requests from the user of the first client device 152 and/or the user of the second client device 154 to execute the first graph algorithm 132 and/or the second graph algorithm 134, which operate on the graph workspace 120. According to some implementations of the current subject matter, the RDBMS 410 can be configured to enforce one or more security rules. For example, the RDBMS 410 can execute the first graph algorithm 132 and/or the second graph algorithm 134 only when the requesting user has the requisite privilege to execute the first graph algorithm 132 and/or the second graph algorithm 134. Here, the owner and/or creator of the graph workspace 120 may have the requisite privilege to execute the first graph algorithm 132 and/or the second graph algorithm 134 on the graph workspace 120. Alternately and/or additionally, the owner and/or creator of the graph workspace 120 can grant execution privilege to one or more other users (e.g., the user of the second client device 154) such that stored procedure execution module 414 will also allow these users to execute the first graph algorithm 132 and/or the second graph algorithm 134 on the graph workspace 120.

The RDBMS 410 can respond, by at least applying one or more security rules of the RDBMS 410, to one or more requests from the first user to export the graph algorithm (510). For instance, the RDBMS 110 (e.g., the stored procedure export module 416) can respond to requests to export the first graph algorithm 132 and/or the second graph algorithm 134 (e.g., to the database 160) by determining whether the requesting user has the requisite privilege to export the first graph algorithm 132 and/or the second graph algorithm 134 as well as the underlying graph workspace 120. According to some implementations of the current subject matter, the owner and/or creator of the graph workspace 120 has the privilege to export the first graph algorithm 132 and/or the second graph algorithm 134, which operate on the graph workspace 120. As such, the RDBMS 110 can allow the user of the first client device 152 to export the first graph algorithm 132 and/or the second graph algorithm 134 as well as the graph workspace 120 to the database 160. By contrast, the user of the second client device 154, who is not an owner and/or creator of the graph workspace 120, does not have the requisite privilege to export the first graph algorithm 132 and/or the second graph algorithm 134. Thus, the RDBMS 110 can deny requests from the user of the second client device 154 to export the first graph algorithm 132 and/or the second graph algorithm 134 as well as the underlying graph workspace 120.

Figure 6:
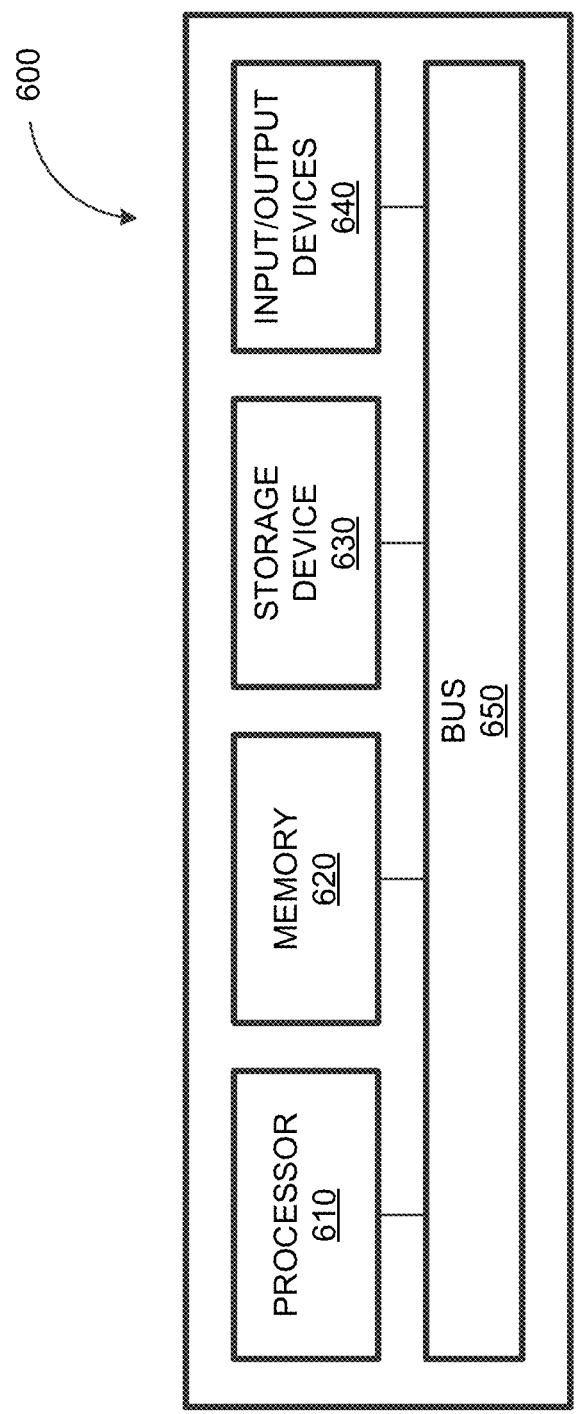
FIG. 6 depicts a block diagram illustrating a computing system consistent with some implementations of the current subject matter.

FIG. 6 depicts a block diagram illustrating a computing system 600 consistent with some implementations of the current subject matter. Referring to FIGS. 1 and 5, the computing system 600 can be used to implement the RDBMS 410 and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the RDBMS 410. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
      receiving, from a first user, a request to define a graph algorithm operating on a graph workspace, the graph workspace comprising a database object within a relational database, the graph workspace including at least a portion of graph-modeled data stored at the relational database, and the graph algorithm operating on at least the portion of the graph-modeled data within the relational database;
      applying a first security rule associated with the relational database, the applying comprising determining whether the first user has a privilege to define the graph algorithm operating on the graph workspace within the relational database; and
      storing, at the relational database, the graph algorithm at the relational database in response to the first user being determined to have the privilege to define the graph algorithm operating on the graph workspace.

2. The system of claim 1, wherein the first user is determined to have the privilege to define the graph algorithm operating on the graph workspace when the first user is a creator and/or owner of the graph workspace.

3. The system of claim 1, further comprising:
   responding to a request from the first user to execute the graph algorithm operating on the graph workspace, the responding comprising applying a second security rule associated with the relational database to at least determine whether the first user has a privilege to execute the graph algorithm.

4. The system of claim 3, wherein the first user is determined to have the privilege to execute the graph algorithm when the first user is a creator and/or owner of the graph workspace.

5. The system of claim 3, wherein the first user is determined to have the privilege to execute the graph algorithm when a second use who is a creator and/or owner of the graph workspace grants the first user the privilege to execute the graph algorithm.

6. The system of claim 1, further comprising:
   responding to a request from the first user to export the graph algorithm operating on the graph workspace, the responding comprising applying a third security rule associated with the relational database to determine whether the first user has a privilege to export the graph algorithm.

7. The system of claim 6, wherein the first user is determined to have the privilege to export the graph algorithm when the first user is a creator and/or owner of the graph workspace.

8. The system of claim 1, wherein the graph algorithm is stored at the relational database as a stored procedure.

9. The system of claim 8, wherein the storing the graph algorithm as the stored procedure comprises creating a dependency with respect to at least one existing database object, the at least one existing database object comprising a database table, a view, another graph workspace, and/or another graph algorithm.

10. The system of claim 1, wherein the graph algorithm is defined in a domain-specific programming language, and wherein the storing of the graph algorithm comprises converting the graph algorithm from the domain-specific programming language to a relational database specific programming language.

11. The system of claim 1, wherein the graph workspace includes a vertex table and an edge table corresponding to at least the portion of the graph-modeled data stored at the relational database.

12. A computer-implemented method, comprising:
   receiving, from a first user, a request to define a graph algorithm operating on a graph workspace, the graph workspace comprising a database object within a relational database, the graph workspace including at least a portion of graph-modeled data stored at the relational database, and the graph algorithm operating on at least the portion of the graph-modeled data within the relational database;
   applying a first security rule associated with the relational database, the applying comprising determining whether the first user has a privilege to define the graph algorithm operating on the graph workspace within the relational database; and
   storing, at the relational database, the graph algorithm at the relational database in response to the first user being determined to have the privilege to define the graph algorithm operating on the graph workspace.

13. The computer-implemented method of claim 12, wherein the first user is determined to have the privilege to define the graph algorithm operating on the graph workspace when the first user is a creator and/or owner of the graph workspace.

14. The computer-implemented method of claim 12, further comprising:
   responding to a request from the first user to execute the graph algorithm operating on the graph workspace, the responding comprising applying a second security rule associated with the relational database to at least determine whether the first user has a privilege to execute the graph algorithm.

15. The computer-implemented method of claim 14, wherein the first user is determined to have the privilege to execute the graph algorithm when the first user is a creator and/or owner of the graph workspace.

16. The computer-implemented method of claim 14, wherein the first user is determined to have the privilege to execute the graph algorithm when a second use who is a creator and/or owner of the graph workspace grants the first user the privilege to execute the graph algorithm.

17. The computer implemented method of claim 12, further comprising:
responding to a request from the first user to export the graph algorithm operating on the graph workspace, the responding comprising applying a third security rule associated with the relational database to determine whether the first user has a privilege to export the graph algorithm, the first user being determined to have the privilege to export the graph algorithm when the first user is a creator and/or owner of the graph workspace.

18. The computer-implemented method of claim 12, wherein the graph algorithm is stored at the relational database as a stored procedure, the storing of the graph algorithm as the stored procedure comprising creating a dependency with respect to at least one existing database object, the at least one existing database object comprising a database table, a view, another graph workspace, and/or another graph algorithm.

19. The computer-implemented method of claim 12, wherein the graph algorithm is defined in a domain-specific programming language, and wherein the storing of the graph algorithm comprises converting the graph algorithm from the domain-specific programming language to a relational database specific programming language.

20. A non-transitory computer-readable storage medium including program code, which when executed by at least one data processor, causes operations comprising:
receiving, from a first user, a request to define a graph algorithm operating on a graph workspace, the graph workspace comprising a database object within a relational database, the graph workspace including at least a portion of graph-modeled data stored at the relational database, and the graph algorithm operating on at least the portion of the graph-modeled data within the relational database;
applying a first security rule associated with the relational database, the applying comprising determining whether the first user has a privilege to define the graph algorithm operating on the graph workspace within the relational database; and
storing, at the relational database, the graph algorithm at the relational database in response to the first user being determined to have the privilege to define the graph algorithm operating on the graph workspace.

* * * * *